United States Patent [19]

Gaboury

[11] Patent Number: 5,037,198
[45] Date of Patent: Aug. 6, 1991

[54] ILLUMINANT DISCRIMINATOR WITH IMPROVED BOUNDARY CONDITIONS

[75] Inventor: Michael J. Gaboury, Spencerport, N.Y.

[73] Assignee: Eastman Kodak Company, Rochester, N.Y.

[21] Appl. No.: 552,971

[22] Filed: Jul. 16, 1990

[51] Int. Cl.$^5$ .............................................. G01J 1/42
[52] U.S. Cl. .................................... 356/218; 356/226; 250/226; 250/214 R; 324/77 B; 364/485
[58] Field of Search ............... 356/218, 223, 226, 404; 250/214 R, 214 A, 226; 354/430, 473; 324/88 B, 77 R

[56] References Cited

U.S. PATENT DOCUMENTS

| | | | |
|---|---|---|---|
| 3,697,174 | 10/1972 | McCune | 356/404 |
| 4,220,412 | 9/1980 | Shroyer et al. | 356/218 |
| 4,296,374 | 10/1981 | Henry | 324/77 B |
| 4,301,404 | 11/1981 | Ley | 364/484 |
| 4,464,049 | 8/1984 | Schroeder | 356/218 |
| 4,827,119 | 5/1989 | Gaboury | 250/214 R |

Primary Examiner—Richard A. Rosenberger
Assistant Examiner—Hoa Pham
Attorney, Agent, or Firm—Edward Dugas

[57] ABSTRACT

The present invention is an apparatus and an associated method for determining the dominant scene illuminant which apparatus is more reliable and accurate than previous illuminant detectors. Mixed illuminant detection has been added to the choice of illuminant categories, to take care of the cases where one illuminant is not dominant and color correction is best handled by printing algorithms. A new boundary condition has been devised to eliminate detection errors seen when fluorescent illumination mixes with certain quantities of daylight causes a tungsten reading. The apparatus incorporates a thresholding technique to improve over existing art. The apparatus is comprised of a means for converting illuminate light into corresponding electrical signals. The electrical signals are then directed to a log amplifier wherein they are compressed to approximately form a signal having one term equal to the log of the DC term plus a ratio of the dominant AC components to the DC components. A second portion of the apparatus receives the signals from the log amplifier and provides two filtered outputs which are multiples of the frequency of expected artificial illumination sources. Each of the output signals is compared against a plurality of threshold signals to identify which illuminant components are present. The combination of detected components are then compared against the components of known illumination sources with the closest match identifying the unknown source. Means are provided for combining the output signals from both of the filters to identify mixed sources.

11 Claims, 2 Drawing Sheets

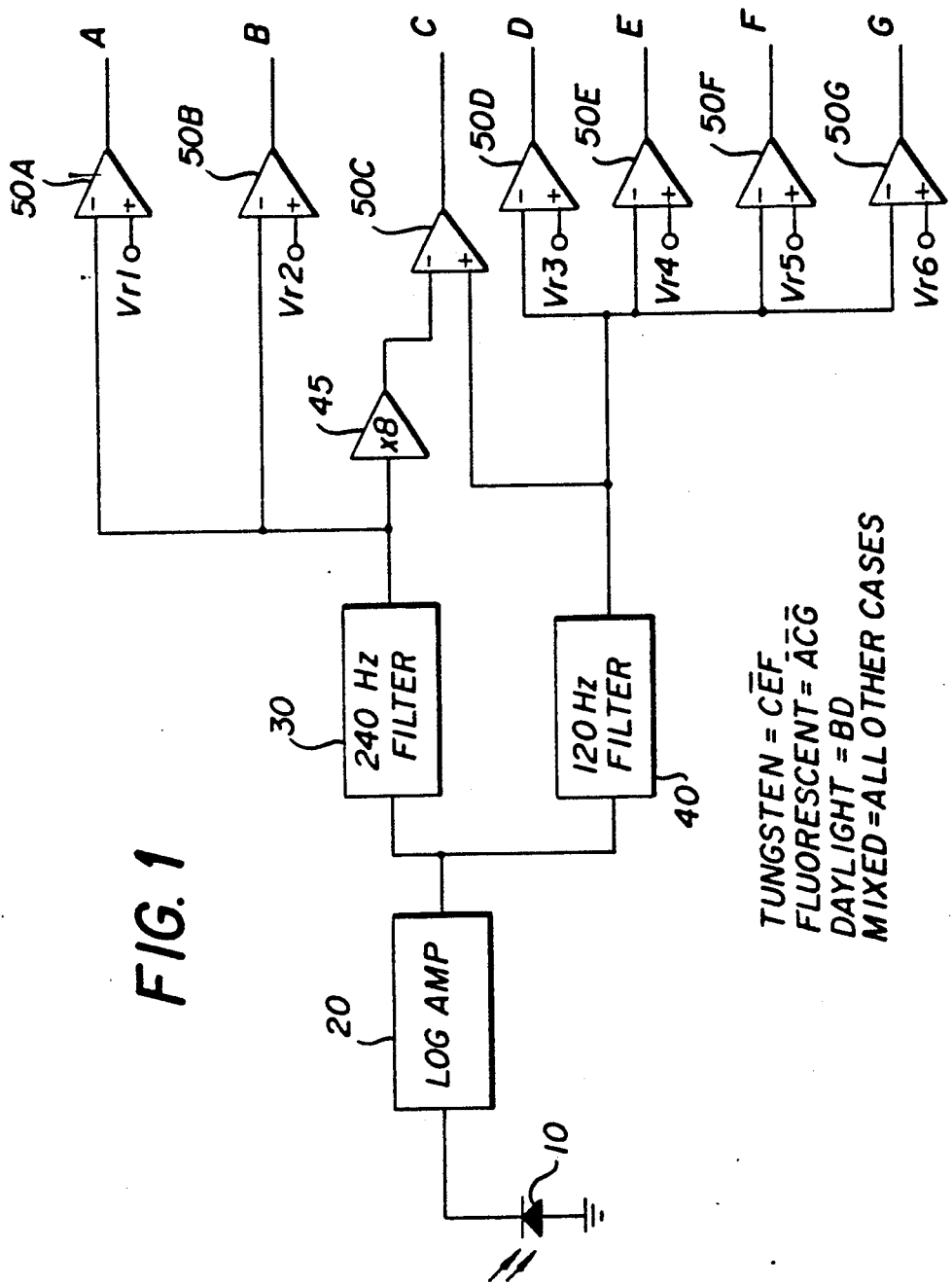

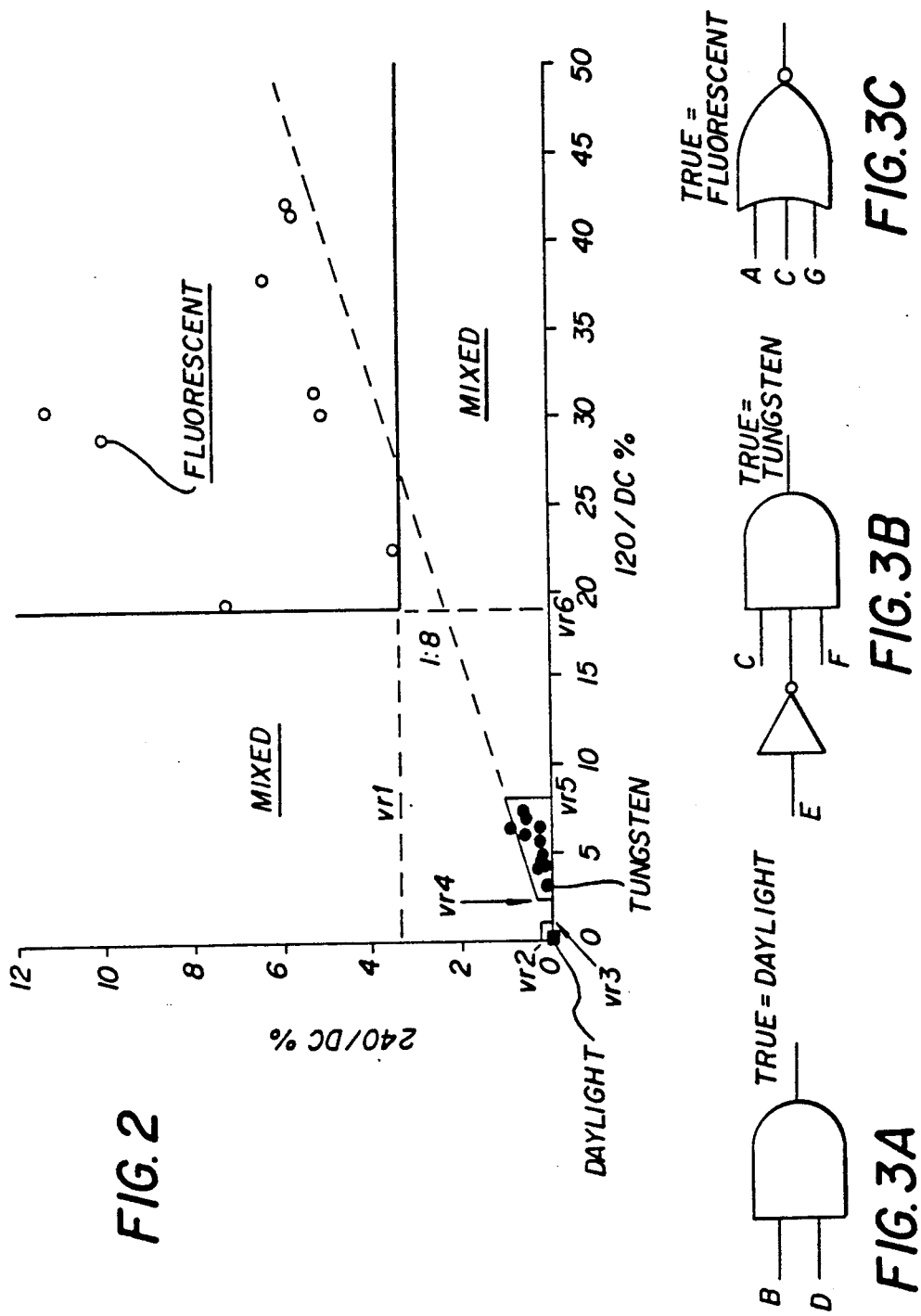

ILLUMINANT DISCRIMINATOR WITH IMPROVED BOUNDARY CONDITIONS

FIELD OF INVENTION

The present invention relates to the field of source light determinations and more particularly to an apparatus and an associated method for discriminating among various types of light sources, such as fluorescent light, incandescent light, mixed light, and natural daylight.

BACKGROUND OF THE INVENTION

To produce faithful photographic reproductions of multicolored scenes, the color balance of the photographic film must be compatible with the spectral characteristics of the scene illuminant. Many photographic color emulsions are color balanced for use with natural daylight and others are color balanced for use with incandescent illumination. To properly expose a color film with an illuminant for which the film is not color balanced it is necessary to use color compensating filters.

A patent of interest for its' teaching of a method and apparatus for discriminating illuminant light is U.S. Pat. No. 4,220,412 entitled "Illuminant Discrimination Apparatus and Method" by R. A. Shroyer, et al. The method and apparatus disclosed in that patent utilizes the temporal signatures of the various light components based upon the harmonical distorted sine wave signal that is derived from the illuminant source impinging on a photodiode. The photodiode produces an electrical signal having an amplitude which varies with the instantaneous intensity of the illuminant. A means is provided for detecting the amount of harmonic distortion in the signal and for indicating the type of illumination impinging on the photodiode as a function of the distortion. In addition, the apparatus is combined with flicker ratio detecting circuitry to provide a system which is capable of discriminating between fluorescent light, incandescent light and natural daylight. The flicker ratio is the ratio of the brightest to the dimmest intensities of the light during a given time interval. Natural light, like other light emanating from a source of constant brightness, has a flicker ratio of unity. Artificial light sources, being energized by ordinary household line voltage, have a brightness which flickers at approximately 120 Hz, twice the frequency of the line voltage. Owing to the different rates at which the energy-responsive elements of incandescent and fluorescent lamps respond to applied energy, such illuminance can be readily distinguished by their respective flicker ratio.

With improvements in the state of the art it is highly desirable to have a system that is heavily digitized for performing the illumination detection. Such systems are readily manufactured incorporating integrated circuits for size and cost reductions. It is highly desirable to keep the use of analog circuits to a minimum as analog circuits are more difficult to implement. In addition, signal processing of the type used with this invention is more quickly accomplished with digital circuitry. In camera applications, the illuminant light source has to be determined almost simultaneously with the pressing of the shutter button in order to provide meaningful aperture adjustment information.

Because illumination takes the form of a periodic wave other methods of deriving signal equivalents are suggested. One patent of interest for its handling of the analysis of periodic waveforms is U.S. Pat. No. 4,301,404 entitled "Methods and Apparatus for Analyzing Periodic WaveForms" by A. J. Ley. In that patent, a periodic waveform is repetitively sampled at an integer multiple of the frequency of the waveform over a number of cycles and a sum is formed for each sample with the corresponding sample in the previous cycles. A Fourier transformation is applied to the summed samples to derive a measurement of the component corresponding to the summed samples and to the waveform in general.

Another patent of interest for its teaching is, U.S. Pat. No. 4,296,374 entitled "Wide Band Digital Spectrometer" by P. S. Henry. In that patent, the inventor utilizes a Walsh Fourier transformation to perform an analysis of a periodic waveform. The disclosed apparatus performs a wideband digital spectrometry utilizing Walsh functions to achieve a simplified method of producing the Fourier power spectrum of an input signal.

The patents referenced above talk about the frequency contents present when observing the temporal light intensity of various categories of illuminant (i.e. incandescent, fluorescent, and daylight illumination). They also show methods for detecting these frequency components and determining the illuminant category by the use of thresholds.

SUMMARY OF THE INVENTION

The present invention is an apparatus and an associated method for determining the dominant scene illuminant which apparatus is more reliable and accurate than previous illuminant detectors. Mixed illuminant detection has been added to the choice of illuminant categories, since in cases where one illuminant is not dominant color correction is best handled by printing algorithms. A new boundary condition has been devised to eliminate detection errors seen when fluorescent mixed with certain quantities of daylight causes a tungsten reading.

The apparatus incorporates a thresholding technique to improve over the existing art. The apparatus is comprised of a means for converting illuminate light into corresponding electrical signals. The electrical signals are then directed to a log amplifier wherein they are compressed to approximately form a signal having one term equal to the log of the DC term plus a ratio of the dominant AC components to the DC components. A second portion of the apparatus receives the signals from the log amplifier and provides two filtered outputs which are multiples of the frequency of expected artificial illumination sources. Each of the output signals is compared against a plurality of threshold signals to identify which illuminant components are present. The combination of detected components are then compared against the components of known illumination sources with the closest match identifying the unknown source. Means are provided for combining the output signals from both of the filters to identify mixed sources. In the preferred embodiment of the invention the first filter is a 240 Hz filter and the second filter is a 120 Hz filter.

From the foregoing it can be seen that it is a primary object of the present invention to provide an improved illuminant discrimination apparatus for detecting daylight, mixed illumination sources, tungsten and fluorescent illumination sources.

It is a further object of the present invention to provide an apparatus for identifying illumination sources which apparatus is conducive to digital implementation.

It is yet another object of the present invention to provide an apparatus which utilizes a ratio of the artificial illumination frequency components to define the upper boundary of a tungsten region.

These and other objects of the present invention will become more apparent when taken in conjunction with the following description and drawings wherein like characters indicate like parts and which drawings form a part of the present specification.

BRIEF DESCRIPTION OF THE DRAWINGS

FIG. 1 illustrates in block diagram form the preferred apparatus implementation of the present invention.

FIG. 2 is a chart illustrating the performance characteristics of the apparatus of FIG. 1.

FIGS. 3A, 3B, and 3C illustrate in logic circuit form one set of combinational logic that may be used with the preferred apparatus implementation of FIG. 1.

DESCRIPTION OF THE PREFERRED EMBODIMENT

Referring to FIG. 1, illuminant light is detected with a photodiode 10 to provide an electrical signal which is a function of spectral content of the illuminant light. The signal from the photodiode 10 is compressed by a logarithmic amplifier 20. The output signal from logarithmic amplifier 20, given the relative amplitudes of the various frequency components of the input signal, is approximately equal to a log of the DC term plus a ratio of the dominant AC components to the DC components. This follows from the fact that, $$Ln(1+x) = x - x^2/2 + x^3/3 \ldots (-1 < x < 1).$$

The frequency components detected from the three common categories are:

| Daylight approximation | $Io = Idc$ |
| --- | --- |
| Tungsten approximation | $Io = Idc + IaSin(wt);$ $w = $ twice the line frequency |
| Fluorescent approximation (arc lamp) | $Io = Idc + IaSin(wt) + IaSin(2wt)$ |

Since the distortion terms add high harmonics, the only danger of misidentification lies in mistaking a tungsten for a fluorescent.

Analysis:

$$Ln(Io) = Ln(Idc + IaSin(wt))$$
$$Ln(Idc(1 + bSin(wt)); \text{ where } b = Ia/Idc$$

Since, $Ln(1 + x) = x - x^2/2 + x^3/3 \ldots (-1 < x < 1)$ $$Ln(Io) = Ln(Idc) + bSin(wt) - b^2Sin(wt)^2/2 + \ldots$$

In the case of tungsten light, the ratio Ia/Idc is generally never greater than 0.05 or 5%. This means the third term is only slightly more than ½ LSB of an 8-bit system using the full range of the input.

Returning to FIG. 1, the output of the filter sections correspond to the ratio AC:DC of the respective filter frequencies. The filter outputs are sent to comparator amplifiers 50A-50G. Each of the comparator amplifiers receives a threshold reference voltage Vr1-Vr6. The voltage values assigned to Vr1-Vr6 are determined from the chart of FIG. 2. The amplifier 50C receives the output signals from both filters 30 and 40 with the output from the 240 Hz filter 30 being boosted in gain by a factor of 8 in a gain amplifier 45.

The comparators 50A and 50B form a first comparing means. A second comparing means is formed by comparators 50D through 50G with comparator 50C along with gain amplifier 45 forming a third comparing means. Although various types of logic circuitry can be used to form the desired outputs from the outputs A-G, the preferred logic circuitry is illustrated in FIGS. 32A-3C.

As can be seen in FIGS. 3A-3C daylight requires both a B and a D input, Tungsten requires a C and an F input but not E, and fluorescent takes not A, C, and G. All other combinations reflect a mixed illuminant.

FIG. 2 illustrates the data taken from several light sources plotted such that the 120 Hz/DC ratio is the ordinate axis and the 240 Hz/DC ratio is the vertical axis. The boundary regions for mixed, fluorescent, daylight and tungsten illumination are also illustrated in FIG. 2. The daylight region (area) is defined by the voltage values Vr2 and Vr3 which exists around the (0,0) region. The tungsten region is defined by Vr4, Vr5 and a dotted gain line. The mixed regions are set off by Vr1, Vr6 and the dotted gain line. The major improvements in these regions are seen to be an additional mixed region for cases where there is no predominant illuminant category present and a diagonal boundary condition which is formed by the X8 diagonal gain line of amplifier 45. There is a lower limit on the ratio 240 Hz:120 Hz. For the purposes of an easy implementation, the slope of 1:8 was chosen since it results in a low percentage of tungsten falling into the mixed region, however, this ratio may be a little smaller for optimum discrimination. Finally, although there are no line harmonics present in daylight lit scenes, there is a possibility of dominantly daylight lit scenes so a region close to the origin has been set aside as daylight.

This technique does not limit itself to one particular method of implementation. The block diagram of FIG. 1 illustrates the preferred embodiment, implemented with comparators, it may also be digitized anywhere in the path after the log stage and processed in a microprocessor. Frequency components listed are those seen in regions where 60 Hz power grids are used but they can be extended by replacing 120 Hz with the 2nd harmonic of the line frequency and 240 Hz with the 4th harmonic, etc.

While there has been shown what is considered to be the preferred embodiment of the present invention, it will be manifest that many changes and modifications may be made therein without departing from the essential spirit of the invention. It is intended therefore, in the annexed claims to cover all such changes and modifications as may fall within the true scope of the invention.

I claim:

1. An illuminant discriminator comprising:
   photodetector means for converting an impinging illuminant into an analog signal;
   a log means coupled to said photodetector means for converting said analog signal into a signal having a DC component and a ratio component;
   a first and a second filter means each having a filtering frequency corresponding to harmonics of the fundamental frequency of an artificial illuminant power source;
   first and second comparing means each having at least two inputs, one of which is coupled to receive the output from said first and said second filter means, respectfully, and the other of which is adapted to receive threshold signals corresponding in level to the level of different types of illuminants for providing outputs indicating the magnitude of the outputs from said first and said second comparing means with respect to the received threshold signals;

third comparing means for comparing the output of said first filter means with the output from said second filter means and for providing an output indicating which is greater; and logic means coupled to the outputs of said first, second, and third comparing means for determining the type of illuminant impinging on said photodetector means from the outputs sensed by said comparing means.

2. The illuminant discriminator according to claim 1 wherein said first and second comparing means are comprised of:

a plurality of comparator circuits each having at least two inputs for receiving on one of its inputs a respective output from said first and said second filter means and for receiving on the other inputs the threshold signals.

3. The illuminant discriminator of claim 2 wherein said third comparator is comprised of:

a gain amplifier having an input connected to the output of said first filter means for providing a multiple gain to the output signal from said first amplifier means;

a comparator circuit means having two inputs one of which is connected to the output of said gain amplifier and the other of which is connected to the output of said second filter means for providing an output indicating which is greater.

4. The illuminant discriminator of claim 3 wherein two of said plurality of comparator circuits are connected to the output of said first filter means and four of said plurality of comparator circuits are connected to the output of said second filter means.

5. The illuminant discriminator of claim 4 wherein the filtering frequency of said first filter means is 240 Hz and the filtering frequency of said second filter is 120 Hz.

6. The illuminant discriminator of claim 5 wherein the multiple gain of said gain amplifier is 8.

7. The illuminant discriminator of claim 6 wherein the threshold signal applied to a first of two comparator circuits connected to the output of said first filter means is set to a value corresponding to the lower limit of fluorescent light established by the ratio 240/DC %, and the threshold signal applied to the second of the two comparator circuits connected to said first filter means is set to a value corresponding to the limit of daylight established by the ratio 240/DC %.

8. The illuminant discriminator according to claim 7 wherein the threshold signal applied to the first of the four comparator circuits connected to said second filter means is set to a value corresponding to the limit of daylight established by the ratio 120/DC %, and wherein the threshold signal applied to the second of the comparator circuits connected to the output of said second filter means is set to the value of the lower limit of tungsten light established by the ratio 120/DC %, and wherein the threshold signal applied to the third of the comparator circuits connected to the output of said second filter means is set to a value corresponding to the upper limit of tungsten light as established by the ratio 120/DC %, and wherein the threshold signal applied to the fourth of the comparator circuits connected to said second filter means is set to a value corresponding to the lower limit of fluorescent light as established by the ratio 120/DC % so as to establish boundaries for fluorescent, daylight, tungsten, and mixed illuminants.

9. The illuminant discriminator according to claim 8 wherein said logic means is comprised of:

a first AND gate having two inputs one of which is connected to the output of the second comparing circuit that is connected to the output of said first filter means and the other of which is connected to the output of the first comparing circuit connected to the output of said second filter means for providing an indication of the presence of a daylight illuminant;

an inverter means having its input connected to the output of the second comparator circuit connected to the output of said second filter means for inverting the output signal from said second comparator circuit;

a second AND gate having three inputs one of which is connected to the output of said third comparing means and the second of which is connected to the output of said inverting means, and the third of which is connected to the output of the third comparing circuit that is connected to the output of said second filter means for providing an indication of the presence of a tungsten illuminant; and an OR gate having three inputs one of which is connected to the output of the first comparator circuit connected to said first filter means, and the second input of which is connected to the output of said third comparator means, and the third of which is connected to the output of the fourth comparator circuit so as to provide an indication of the presence of a fluorescent illuminant with all other conditions indicating the presence of a mixed illuminant.

10. A method for determining an illuminant impinging on a photodector comprising the steps of:

converting the output from said photodetector into a signal having a DC component and a ratio component;

filtering the signal from said photodetector with a first and a second filter with each filter having a filtering frequency corresponding to differing multipliers of the base frequency of an artificial illuminant source;

comparing in a first and second comparing means the filtered signals from the first and the second filter, respectively, against respective threshold values with each comparing means having at least two inputs, one of which is coupled to receive the output from said first and said second filter, respectfully, and the other of which is adapted to receive the threshold signals, corresponding in level to the level of different types of illuminants for providing outputs indicating the magnitude of the outputs from said first and said second comparing means with respect to the received threshold signals;

comparing in a third comparing means the output of said first filter with the output from said second filter and providing an output indicating which is greater; and utilizing logic devices coupled to the outputs of said first, second, and third comparing means for determining the type of illuminant impinging on said photodetector from the outputs sensed by said comparing steps.

11. The method for determining the illuminant impinging on a photodetector according to claim 10 and further comprising the step of:
selecting the values of the threshold signals to block areas defining daylight, mixed, tungsten, and fluorescent illuminants.

* * * * *